May 8, 1934. I. FLORMAN Re. 19,162

CIGAR LIGHTER

Original Filed Jan. 20, 1933

Inventor

Irving Florman.

By Lawrence V. Cox

Attorney

Reissued May 8, 1934

Re. 19,162

UNITED STATES PATENT OFFICE 19,162

CIGAR LIGHTER

Irving Florman, New York, N. Y.

Original No. 1,993,729, dated April 11, 1933, Serial No. 652,743, January 20, 1933. Application for reissue January 27, 1934, Serial No. 708,921

4 Claims. (Cl. 67—7.1)

This invention relates to portable cigar lighters and more particularly to a lighter of this type which is adapted to be secured to a package of cigarettes.

The primary object of my invention is to provide a lighter of small and compact form and provided with means by which it can be removably attached to an ordinary package of cigarettes, so that it will be immediately available to the smoker.

A further object of my invention is to provide a lighter of this type which is of substantially the same shape as the end wall or some other wall of the package so that it will fit smoothly in the pocket of the user along with the package.

Further objects and advantages of the invention will appear more fully from the following description when taken in conjunction with the accompanying drawing which forms a part thereof.

Figure 1:
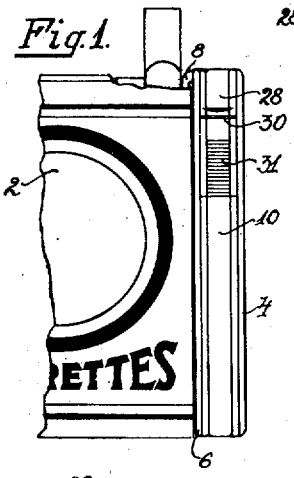
Fig. 1 is a side elevation of my lighter attached to a package of cigarettes.
Figure 2:
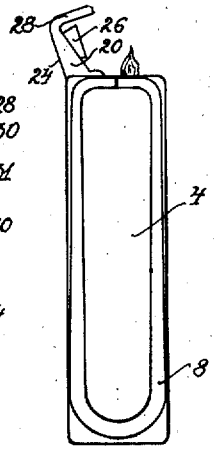
Fig. 2 is a side elevation of the lighter.
Figure 5:
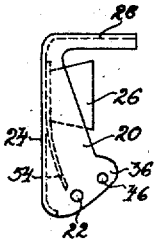
Fig. 5 is a detail side elevation of the snuffer member.
Figure 4:
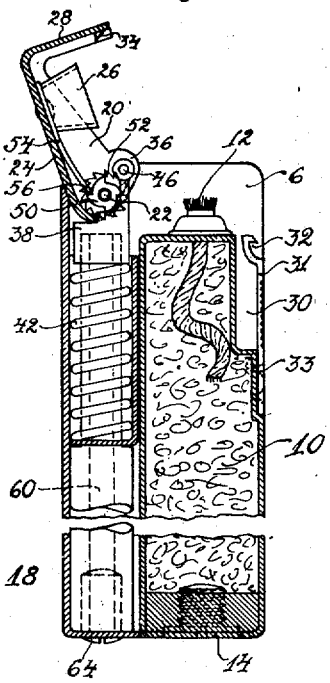
Fig. 4 is an enlarged front view of the lighter with the fuel chamber removed.
Figure 3:
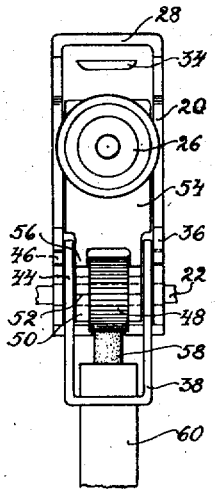
Fig. 3 is an enlarged cross section substantially on the line 3—3 of Fig. 4.
Figure 6:
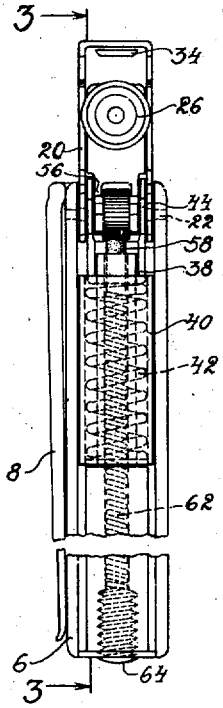
Fig. 6 is a detail front view of the lighting mechanism.

In the drawing, 2 is an ordinary pack of cigarettes, a portion of the top of which has been removed to permit the removal of cigarettes from the package. 4 is the lighter casing which has the same shape as the end wall (that is, the narrower vertical wall, Fig. 1) of the pack and is made thin and rectangular so that it is in effect a continuation of the shape of the package. The lighter casing thus consists of spaced, parallel quadrilateral rectangular side walls 6, and narrower rectangular end walls substantially at right angles to said side walls. On one side wall 6 of the casing is secured an attachment tongue 8 consisting of a U-shaped member secured at its top to the side wall and extending downwardly, the body of this member 8 being slightly spaced from the casing wall. As is quite evident, this tongue may be slipped down inside the package and will hold the lighter securely against the end wall.

The lighter itself is preferably of the pyrophoric type. It consists of a fuel chamber 10 which fits between the side walls of the casing but is of less width than the casing. The chamber 10 carries at its top a wick 12 and may be supplied with fuel through an opening 14 in the bottom which is closed by a threaded member. It will be noted that this chamber forms the front wall of the casing and lies flush with the front edges of the side walls.

The top wall of the casing is formed by a snuffer cap 20, which is pivoted at 22 between the side walls. The upper face of this cap is flush with the upper edges of the side walls. The snuffer cap includes a horizontal portion 24 which forms the top wall of the casing, a cup 26 on the lower side thereof which covers the wick 12 when the lighter is closed, and a downwardly extending front tongue 28. The front end wall 7 of the fuel chamber is cut away as at 30 and provided with a spring tongue 31 having a notch 32 which is engaged by a nose 34 on the lower end of the downwardly extending portion 28. The tongue 31 is secured at 33 to the front end wall of the fuel chamber.

The snuffer 20 is also provided on its lower side and at a point slightly in front of the pivot 22 with ears 36. A slide member 38 is guided in a frame 40 which is mounted on the back wall of the casing and is constantly urged upwardly by a spring 42. The member 38 is provided with upstanding ears 44 which are pivoted at 46 to the ears 36 of the snuffer. It will be seen that the snuffer will thus be normally urged to an upper or raised position.

Mounted on the axis 22 is also a flint wheel 48 on each side of which are bosses 50 provided with teeth 52. The lower face of the snuffer carries a spring member 54 having tongues 56 which rest on the bosses 50. It will be obvious, as shown in the drawing, that the teeth are so shaped that the spring tongues 56 will engage the teeth 52 and that as the snuffer is raised by the spring the flint wheel will be rotated thereby. On the return movement of the snuffer, the spring tongues slip over the teeth and cause no rotation of the wheel.

The flint 58 is mounted in a tube 60 which extends upward through the frame 40, spring 42 and member 38. The flint is urged against the flint wheel by a spring 62 which is held in the tube by a threaded closure 64.

The operation of the device should be clear. When it is secured to a pack of cigarettes, the user in order to light it presses inward on the spring tongue 31. This releases the latch formed by the members 32 and 34. The snuffer is immediately raised by the spring 42 and the flint wheel is turned so that it projects sparks against the wick. After the lighter has been used, the snuffer is pushed down manually and is automatically latched in closed position.

When the cigarettes of the package are exhausted, the lighter is removed and the package thrown away. The lighter can then be secured to a new package.

It will be noted that by the arrangement of the latch members the front of the lighter casing is perfectly smooth and unbroken. In fact, the whole lighter when closed has the appearance of a smooth rectangular box.

While I have described herein one embodiment of my invention, I wish it to be understood that I do not intend to limit myself thereby except within the scope of the appended claims.

I claim:

1. A cigar lighter comprising a casing having spaced, parallel quadrilateral rectangular side walls of substantially the same size and shape as the end wall of a package of cigarettes, lighting mechanism between said side walls including a wick located at a point below the upper edges of the side walls and a snuffer movable to cover and uncover the wick, said snuffer having a flat top surface which, when the snuffer is in covering position, lies substantially flush with the top edges of the side walls, and a tongue secured at its upper end to one of said side walls at its top, said tongue extending downwardly substantially parallel to but slightly spaced from the side wall, said tongue being of substantially the same width as said side wall, whereby to support the lighter on the end wall of a package of cigarettes when the tongue is inserted into the package with the end wall of the package between the tongue and the side wall of the lighter.

2. A cigar lighter comprising a casing having spaced, substantially parallel quadrilateral rectangular side walls of substantially the same size and shape as the end wall of a package of cigarettes and having a fuel holding chamber between said side walls, said casing having substantially rectangular end walls narrower than said side walls, lighting mechanism between said side walls and a tongue secured at its upper end to one of said side walls at its top, said tongue extending downwardly substantially parallel to but slightly spaced from the side wall, said tongue being of substantially the same width as said side wall, whereby to support the lighter on the end wall of a package of cigarettes when the tongue is inserted into the package with the end wall of the package between the tongue and the side wall of the lighter.

3. A cigar lighter comprising a casing having spaced, substantially parallel quadrilateral rectangular side walls of substantially the same size and shape as the end wall of a package of cigarettes and having a fuel holding chamber between said side walls, said casing having substantially rectangular end walls narrower than said side walls, lighting mechanism between said side walls and a tongue secured at its upper end to one of said side walls at its top, said tongue extending downwardly substantially parallel to but slightly spaced from the side wall, said tongue being of substantially the same width and length as said side wall, whereby to support the lighter on the end wall of a package of cigarettes when the tongue is inserted into the package with the end wall of the package between the tongue and the side wall of the lighter, said tongue comprising spaced parallel legs secured at their upper ends to the casing wall and a portion connecting the lower ends of the legs.

4. A cigar lighter comprising a casing having spaced, substantially parallel quadrilateral rectangular side walls of substantially the same size and shape as the end wall of a package of cigarettes and having a fuel holding chamber between said side walls, cigar lighting means arranged at least principally between said side walls, said casing having rectangular end walls narrower than said side walls, said lighting means including a member extending vertically of one of said end walls, and a tongue secured at its upper end to one of said side walls at its top, said tongue extending downwardly substantially parallel to but slightly spaced from the side wall, said tongue being of substantially the same width as said side wall, whereby to support the lighter on the end wall of a package of cigarettes when the tongue is inserted into the package with the end wall of the package between the tongue and the side wall of the lighter.

IRVING FLORMAN.